United States Patent
Finley et al.

(10) Patent No.: US 9,639,898 B2
(45) Date of Patent: May 2, 2017

(54) TAX ANALYSIS TOOL

(75) Inventors: Richard Finley, Cary, NC (US); Palika Jayasuriya, Pleasanton, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 271 days.

(21) Appl. No.: 13/482,203

(22) Filed: May 29, 2012

(65) Prior Publication Data

US 2013/0262279 A1 Oct. 3, 2013

Related U.S. Application Data

(60) Provisional application No. 61/616,509, filed on Mar. 28, 2012.

(51) Int. Cl.
*G06Q 40/00* (2012.01)
*G06Q 40/02* (2012.01)

(52) U.S. Cl.
CPC .................. *G06Q 40/10* (2013.01)

(58) Field of Classification Search
USPC ........... 707/205, 104.1, 5, 103; 705/347, 10, 705/7.39, 7.11, 30, 31; 1/1
See application file for complete search history.

(56) References Cited

U.S. PATENT DOCUMENTS

| | | | |
|---|---|---|---|
| 6,345,239 B1* | 2/2002 | Bowman-Amuah | G06Q 20/10 703/6 |
| 7,627,620 B2* | 12/2009 | Campos | G06F 17/30539 |
| 7,805,382 B2* | 9/2010 | Rosen | G06Q 10/10 705/321 |
| 2003/0061131 A1* | 3/2003 | Parkan, Jr. | G06Q 10/10 705/30 |
| 2004/0181471 A1* | 9/2004 | Rogers | G06Q 40/123 705/31 |
| 2006/0259515 A1* | 11/2006 | Weinrich | G05B 19/418 |
| 2007/0022026 A1* | 1/2007 | Davidson | G06Q 20/207 705/31 |
| 2007/0112615 A1* | 5/2007 | Maga | G06Q 10/0637 705/7.34 |
| 2007/0233728 A1* | 10/2007 | Puteick | G06Q 10/06 |
| 2009/0187552 A1* | 7/2009 | Pinel | G06F 17/30392 |
| 2010/0299279 A1* | 11/2010 | Davidson | G06Q 20/207 705/347 |
| 2011/0295656 A1* | 12/2011 | Venkatasubramanian | G06Q 10/06393 705/7.39 |
| 2012/0166239 A1* | 6/2012 | Eryaman | G06Q 10/063 705/7.11 |

* cited by examiner

*Primary Examiner* — Scott Zare
*Assistant Examiner* — Reva R Danzig
(74) *Attorney, Agent, or Firm* — Cooper Legal Group, LLC

(57) ABSTRACT

Systems, methods, and other embodiments associated with a tax analysis tool are described. In one embodiment, a method includes providing a tax analysis data model, pre-loaded key performance indicator queries, and a query interface. The example method may also include extracting tax related data from a tax analysis data base and transforming and loading the tax related data into a tax data warehouse that facilitates real time processing of KPI queries.

15 Claims, 9 Drawing Sheets

TAX ANALYSIS TOOL

CROSS REFERENCE TO RELATED APPLICATION

This disclosure claims priority to U.S. Provisional Patent Application Ser. No. 61/616,509 filed on Mar. 28, 2012, entitled "Tax Analysis Tool," which is incorporated herein by reference in its entirety for all purposes.

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Tax authorities are responsible for managing large amounts of revenue across a wide range of business operations processes, including Registrations, Tax Forms, Payments, Accounting, Collections, and Case Management. Tax Commissioners are usually appointed by elected officials and are mandated to administer the tax law fairly and accurately. Tax Commissioners face unique challenges including the need to increase revenue without raising taxes, the need to improve and expand taxpayer and citizen services, and the need to run an efficient business operation that performs within budget. One challenge for Tax Commissioners is measuring the performance of the tax authority.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 6 illustrates one example user interface screen associated with one embodiment of a tax analysis tool.

DETAILED DESCRIPTION

Tax authorities often lack the tools to effectively measure their performance. Tax authorities typically perform day to day operations using a tax transactional system, typically referred to as an On Line Transaction Processing (OLTP) System. The OLTP system includes a tax transaction database that is optimized for inserting and updating data during the processing of tax returns. The structure of a tax transaction database is not optimized for business queries, such as calculating key performance indicators (KPIs). The tax authority rarely has the budget to employ database specialists to develop custom KPI measurement tools using the tax transaction database.

Systems and methods are described herein that provide a tax analysis tool that measures a tax authority's performance against operational goals. In one embodiment, the tax analysis tool described herein includes many preloaded metrics, key performance indicators (KPIs), and reports tailored for use by tax authorities. The preloaded metrics, KPIs, and reports provide significant performance measurement capabilities to a tax authority and decrease or eliminate the need for technical personnel to custom code a measurement system. Examples of preloaded metrics include a metric for how quickly payments are processed or how quickly tax refunds are issued. Examples of preloaded reports include KPI summaries that communicate where each KPI value falls within a range of acceptable values and dashboards that summarize selected KPIs and provide drill down capabilities.

In one embodiment, the tax analysis tool provides a data integrator function that extracts tax related data from a transactional tax database and transforms and loads the data into a tax data warehouse that is optimized for processing queries that provide the various metrics. A tax analysis data model provides the structure for the data warehouse. The tax analysis data model is optimized for processing, in real time, KPI queries that return KPI values. As with the preloaded metrics, KPIs, and reports, the data integrator function is pre-configured to load tax related data into a data warehouse with minimal intervention by technical personnel. In this manner, the tax analysis tool empowers non-technical tax authority personnel to measure a wide variety of metrics and KPIs.

Figure 1:
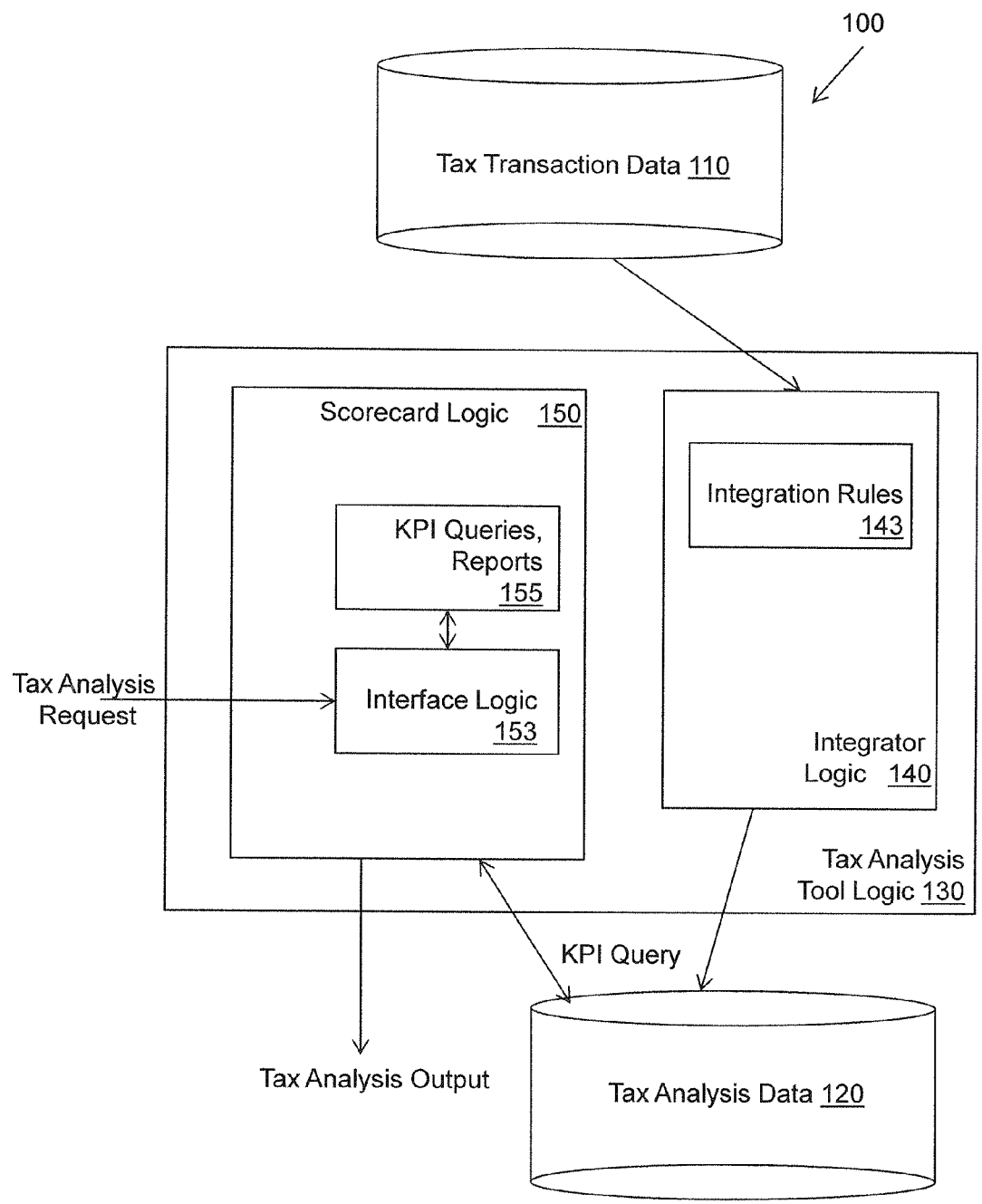
FIG. 1 illustrates an example embodiment of a system associated with a tax analysis tool.

With reference to FIG. 1, one embodiment of a system 100 associated with a tax analysis tool 130 is illustrated. The tax analysis tool 130 is configured to receive a tax analysis request (e.g., a request for a metric value), to access a tax analysis data warehouse 120 to retrieve a response to the request, and to provide a tax analysis output that answers the request. The tax analysis tool 130 includes a scorecard logic 150 that processes tax analysis requests. The scorecard logic 150 includes an interface logic 153 that is capable of receiving input selections and values from a user. The interface logic 153 also renders display screens according to stored report specifications to provide a means of communicating metric values to the user.

The scorecard logic 150 includes preloaded or stored KPI queries and reports 155. Each tax related metric that is measured by the tax analysis tool corresponds to one or more queries that, when executed on the tax analysis data warehouse, return a value for the metric. Certain combinations of tax related metrics are designated as KPIs, and each KPI has a corresponding KPI query that includes one or more query elements that are selection criteria for returning a value for the KPI. The preloaded reports correspond to sets of KPI queries as well as a prescribed format for displaying the results to the KPI queries. The prescribed format maps locations on the display screen with selected KPI query results and also specifies a format for displaying the results (e.g., chart, graph). The prescribed format is used by the interface logic 153 in rendering a reporting display screen (or printout). Example reporting screens and features will be discussed with respect to FIGS. 3-7.

The reporting display screen may include input interface features that allow a user to specify selected KPI query elements. For example, a user may be able to enter a date range that is to be used in aggregating a number of tax forms received. When the corresponding KPI query is executed, query elements for the date range will be set to the user's input values. In this manner, the user may "drill down" on KPIs that are displayed in a reporting screen.

Because the KPI queries and reports are preloaded in the scorecard logic 150, a user of the system does not need to create the KPI queries and reports. The preloaded KPI queries and reports are tailored for tax authorities, based on common aspects of tax policy management, so for many users the preloaded KPI queries and reports will be sufficient for their needs. However, in some embodiments, a user may create custom KPI queries and reports, which are stored in the scorecard logic 150 for future use.

The scorecard logic 150 is capable of executing KPI queries in real time so that a user may change reporting screens or KPI query element values quickly and easily. When the interface logic 153 receives a request for a given report screen, the scorecard logic 150 selects a corresponding set of KPI queries and a report format from the preloaded KPI queries and reports 155. The scorecard logic 150 executes the selected queries on the tax analysis data warehouse 120 and receives returned KPI values. The KPI values are rendered, as the tax analysis output, on a display screen by the interface logic 153.

Figure 1A:
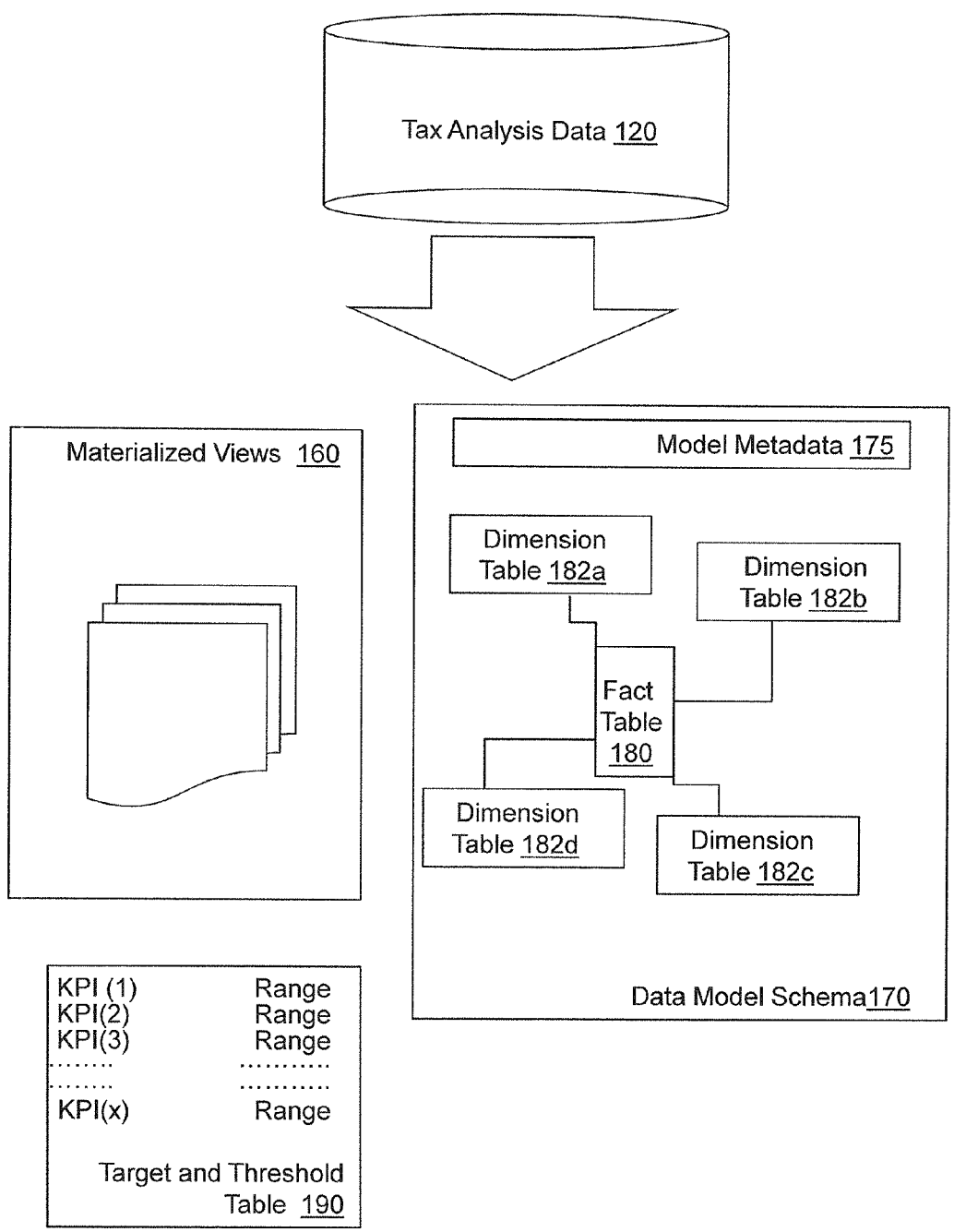
FIG. 1A illustrates an example embodiment of a data model associated with the tax analysis tool of FIG. 1.

To facilitate real time KPI query processing, in one embodiment the tax analysis data warehouse 120 is optimized based on the preloaded KPI queries. The tax analysis data warehouse 120 is configured according to a tax analysis data model, which is shown in FIG. 1A. The term data warehouse is often used to refer to a database that has been optimized for query processing as opposed to transaction processing. Thus, for the purposes of this description, the term will be used for the tax analysis data warehouse 120. However, the tax analysis data warehouse 120 may be implemented using any suitable database or data store that is capable of processing KPI queries.

Referring now to FIG. 1A, a schematic view of selected components of the tax analysis data model according to which the tax data warehouse is organized is shown. The tax analysis data model includes materialized views 160, tax data tables organized in a tax data schema 170, and a target and threshold table 190. In some embodiments, the tax analysis model does not include all of these elements or may include more elements. The tax data is stored in the tax data warehouse 120 in a data model schema 170. The data model schema 170 includes model metadata 175 that identifies where various KPIs are stored in the tax data schema 170. The data model schema 170 includes fact tables keyed to dimension tables in a star schema. A single set or cluster of a fact table 180 and associated dimension tables 182a-182d is shown. The schema may include more clusters. Of course other schemas, such as, for example, a snowflake schema may be used. The use of the star schema facilitates real time processing of KPI queries.

In a star schema, the fact table holds metric values for a given event, for example, the filing of a tax form by John Doe. The fact table may list an identifier for John Doe, a date on which the form was filed, and a form identifier. There may be a dimension table for taxpayers that has a row corresponding to John Doe. The dimension table columns may list information about John Doe, such as age, address, and so on. There may be a dimension table for form identifiers that has a row for the particular form identifier. This dimension table may have columns for attributes of specific tax forms, such as the type of tax form and so on. During query processing, the fact table can be joined with any dimension tables that hold details requested by the query to facilitate fast processing.

The tax analysis data model includes materialized views 160. The materialized views provide aggregated views of selected KPIs. Different materialized views are provided for the selected KPIs with different aggregation periods (e.g., monthly, weekly, yearly). The materialized views facilitate fast KPI query processing when the user is changing between aggregation periods for a KPI.

The target and threshold table 190 stores ranges of values for selected KPIs. This provides contextual information for the KPIs. For example, a given KPI may have an acceptable range, a caution range, and an alert range stored in the target and threshold table 190. When a value for the KPI is returned, it may be assigned a status based on which range it falls within. Various report screens may include color coding or icons that indicate a KPI's status as compared to the ranges in the threshold table or a target value. The values in the target and threshold table 190 may be preloaded or in some embodiments the user may input threshold values that are stored in the threshold table.

Returning now to FIG. 1, to provide real time metric processing, the tax analysis data warehouse is optimized based on the KPI queries. In other words the tax analysis data model is configured to provide fast processing of the preloaded KPI queries. In some embodiments, the tax analysis tool 130 includes an integrator logic 140 that is configured to extract, transform, and load tax related data from a tax transaction database 110 into the tax analysis data warehouse 120. The integrator logic 140 includes preloaded integration rules 143 that specify how tax related data in the tax transaction database 110 is to be transformed for storage in the tax analysis warehouse 120. The integration rules 143 are configured based on a predetermined tax transaction database data model. If a user has a tax transaction database configured according to the predetermined data model, the tax analysis tool 130 can quickly and easily populate the tax analysis data warehouse 120. In other embodiments, the tax analysis tool does not include the integrator logic 140 and the user populates the tax analysis data warehouse 120 according to the tax analysis data model by other means.

Figure 2:
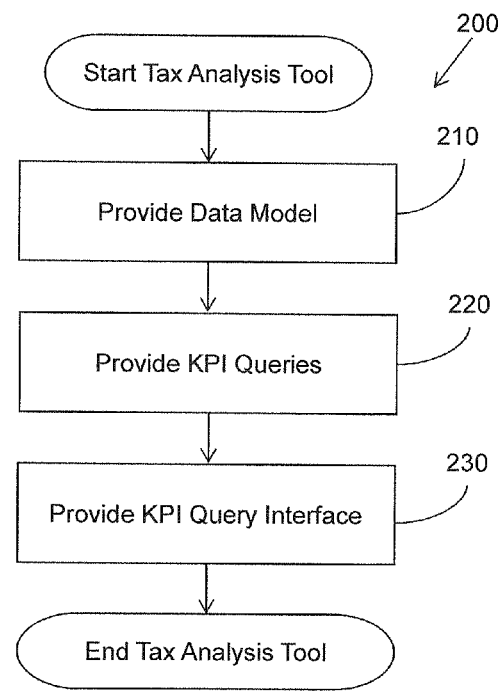
FIG. 2 illustrates an example embodiment of a method associated with a tax analysis tool.

FIG. 2 illustrates one embodiment of a method 200 associated with a tax analysis tool. The method includes, at 210, providing a tax analysis data model. The tax analysis data model may include fact and dimension tables for predetermined tax related data attributes arranged in a star schema. The tax analysis data model may include one or more materialized views for KPI data aggregated for predetermined time periods. The tax analysis data model may include a target and threshold table configured to store value ranges for selected KPIs.

The method includes, at 220, providing one or more key performance indicator (KPI) queries. The KPI queries are configured to be executed on tax related data stored in a tax data warehouse which is configured according to the tax analysis data model. Execution of a KPI query returns a value for a KPI. The method includes, at 230, providing an interface that enables a user to cause a selected KPI query to be executed on the data warehouse to return a value for a corresponding KPI.

In one embodiment, the method also includes providing transformation rules for transforming tax data from a tax transaction database for storage in the tax data warehouse according to the tax analysis data model. The transformation rules are configured to act on a predetermined tax transaction database model. The tax related data is extracted from a tax transaction database and transformed according to the transformation rules. The method includes populating the tax data warehouse with the transformed tax related data.

In one embodiment, the method includes receiving a request for a KPI value; selecting a KPI query that corresponds to the requested KPI; executing the selected KPI query on the tax data warehouse; and returning results to the selected KPI query. In one embodiment, the method includes receiving a user specified range of values for a selected KPI; storing the range of values in a threshold table in the data warehouse; and when a KPI query corresponding to the selected KPI is executed, communicating a returned valued for the selected KPI as compared to the range of values. In one embodiment, the method includes receiving a user specified query element for a KPI query; executing the KPI query with the received query element value; and returning a KPI query result.

FIGS. 3-7 show example report display screens for one embodiment of the tax analysis tool. The KPIs and reports are organized into five areas: taxpayer accounting, revenue accounting, tax and registration forms, tax form lines, and payment processing. Taxpayer accounting KPIs analyze tax, penalty, and interest assessments, waivers given, write offs made, outstanding debt, and credit allocations for assessments. A KPI "watchlist" report is provided that allows a user to view and monitor selected KPIs (e.g., total amount collected, total amount of write off). Users can navigate to other report screens to get more details on each KPI in the watchlist. Revenue accounting KPIs analyze general ledger financial transactions.

Tax and registration form KPIs provide forms processing managers with operational metrics and reports such as form volumes, seasonal trends, exception reasons, and time in error that will help identify processing bottlenecks, improve productivity and enhance services to taxpayers. KPIs that are included in watchlists are: number of forms received, number of forms posted, percentage of forms posted without exceptions, average time to post with exceptions, and percentage received from electronic channel. Tax form KPIs allow a user to visualize metrics based on data extracted from form lines, such as average income, total income, or number of individual income taxpayers. Payment processing KPIs provide payment processing managers with operational metrics and reports on payments distributed, currently suspended, corrected and cancelled. Examples of payment processing KPIs include amount received, amount distributed to obligations, amount in suspense, average days in suspense, percentage payments received on time and percentage received from electronic sources.

Figure 3:
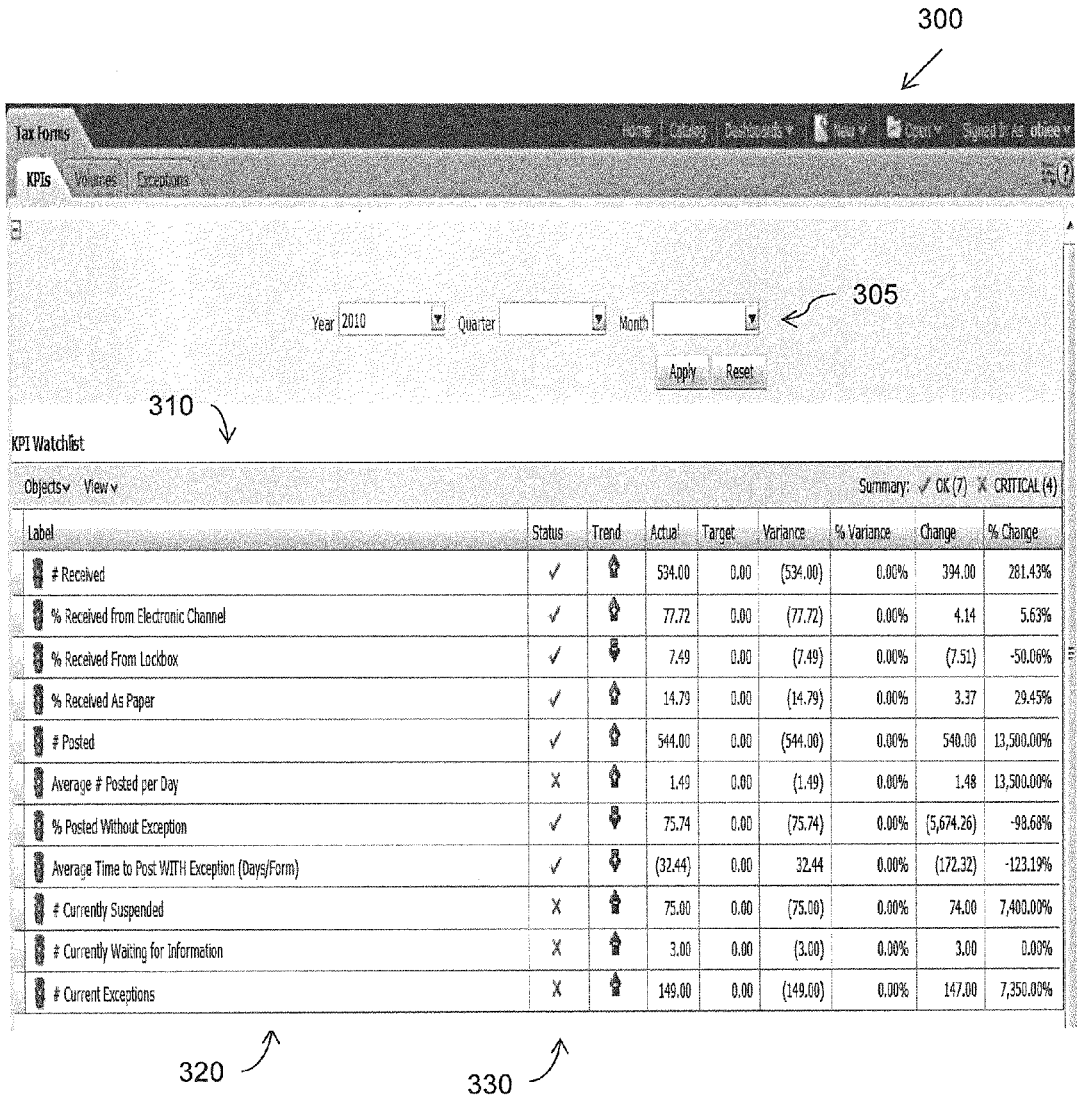
FIG. 3 illustrates one example user interface screen associated with one embodiment of a tax analysis tool.

FIG. 3 illustrates a KPI watchlist screen 300 that provides a date input interface 305. The user uses the date input interface 305 to input a desired aggregation period for the KPIs on the watchlist. A watchlist table 310 lists KPIs 320 associated with tax forms. For example, KPIs for the number of tax forms received, the number of tax forms received by electronic channels, the number of forms posted, and the average number of forms posted per day, among others, are in the watchlist. The watchlist includes a status column 330 that provides an indication as to where the value of the KPI falls in the value ranges in the threshold (e.g., as stored in the threshold table see FIG. 1A). The icons in the status column are color coded. A green check means that the value of the KPI is within the acceptable range. A yellow triangle means that the value of the KPI is in a caution range while a red X means that the value is in an unacceptable range. The color coding helps a user to quickly identify any KPIs that are out of an acceptable range.

The watchlist includes a column for trend, which provides an indication as to how the KPI data is trending. An actual column lists the value for the KPI and a target column shows a target value for the KPI. Other statistical information for the KPI data in the selected aggregation period is displayed in the remaining columns as shown. The user can easily change the aggregation period using the interface 305. When the aggregation period is changed, a different materialized view (see FIG. 1A) may be accessed by the KPI query to return the values for the watchlist 310.

Figure 4:
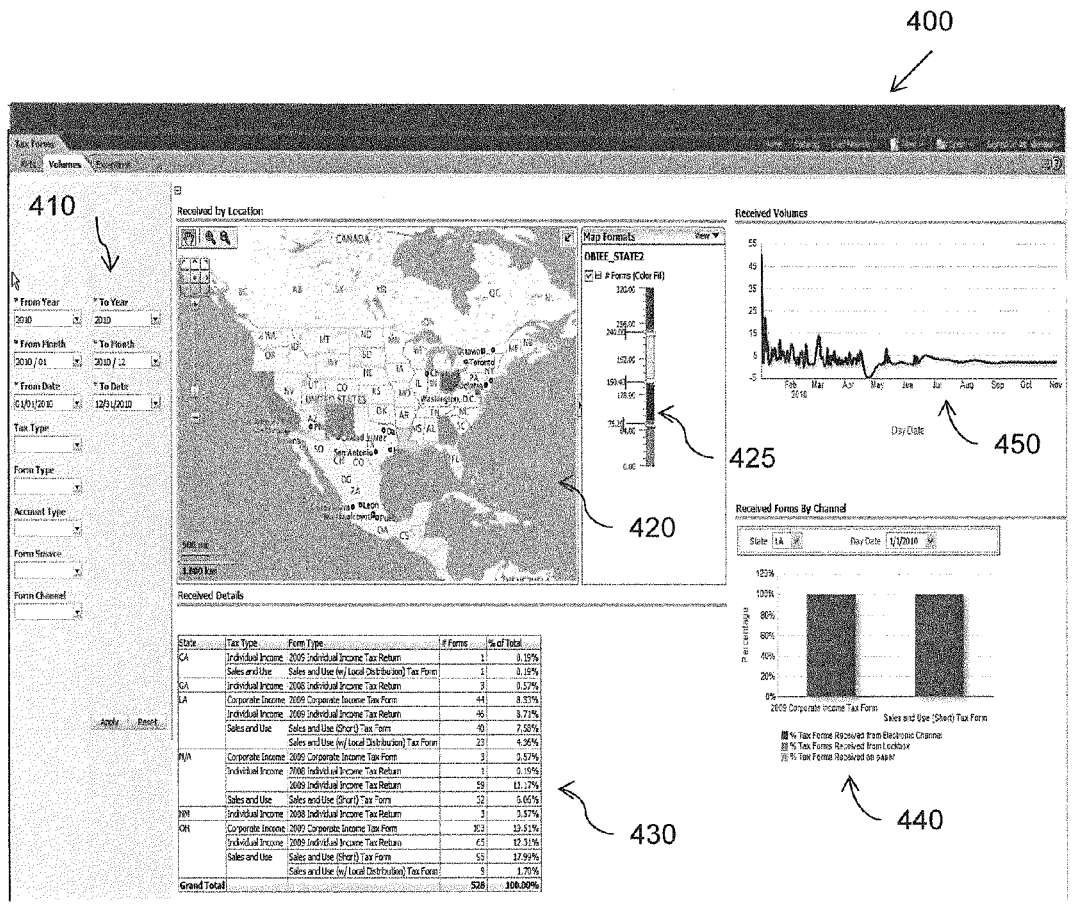
FIG. 4 illustrates one example user interface screen associated with one embodiment of a tax analysis tool.

FIG. 4 illustrates an analysis screen that reports tax form volume data in several formats. An interface portion 410 provides several input interface boxes into which the user enters values for various KPI query elements. For example, the user can enter date ranges as well as specifying filter criteria for the volume data, such as tax type, form type, account type, from source, and from channel. A map portion 420 shows a map with color coded portions of tax form volumes broken out by geographic region (e.g., states). The color code indicates a number of forms filed in each region. A range portion 425 allows the user to change the color coding used in the map for the various ranges of volumes. A detail table 430 shows summary information for the data that is shown on the map.

A bar graph portion 440 shows selected KPIs color coded by received channel for a selected state on a selected date. A line graph portion 450 shows the volume data in a line graph as a function of month. The user can zoom in on the graph or slide the graph to change the month range that is in the graph. This type of detail would be impractical to achieve by querying a transactional database. However, the schema of the tax analysis data model makes this detail achievable in real time.

Figure 5:
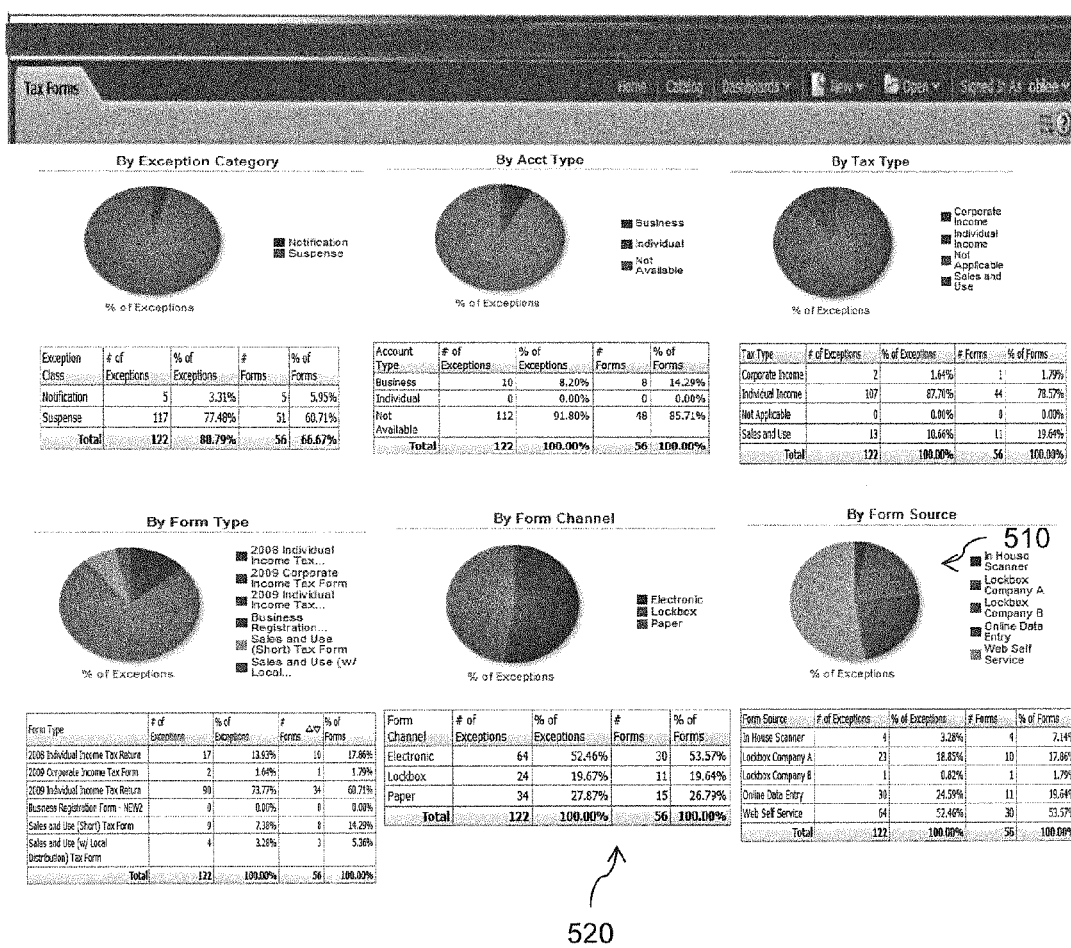
FIG. 5 illustrates one example user interface screen associated with one embodiment of a tax analysis tool.
Figure 6:
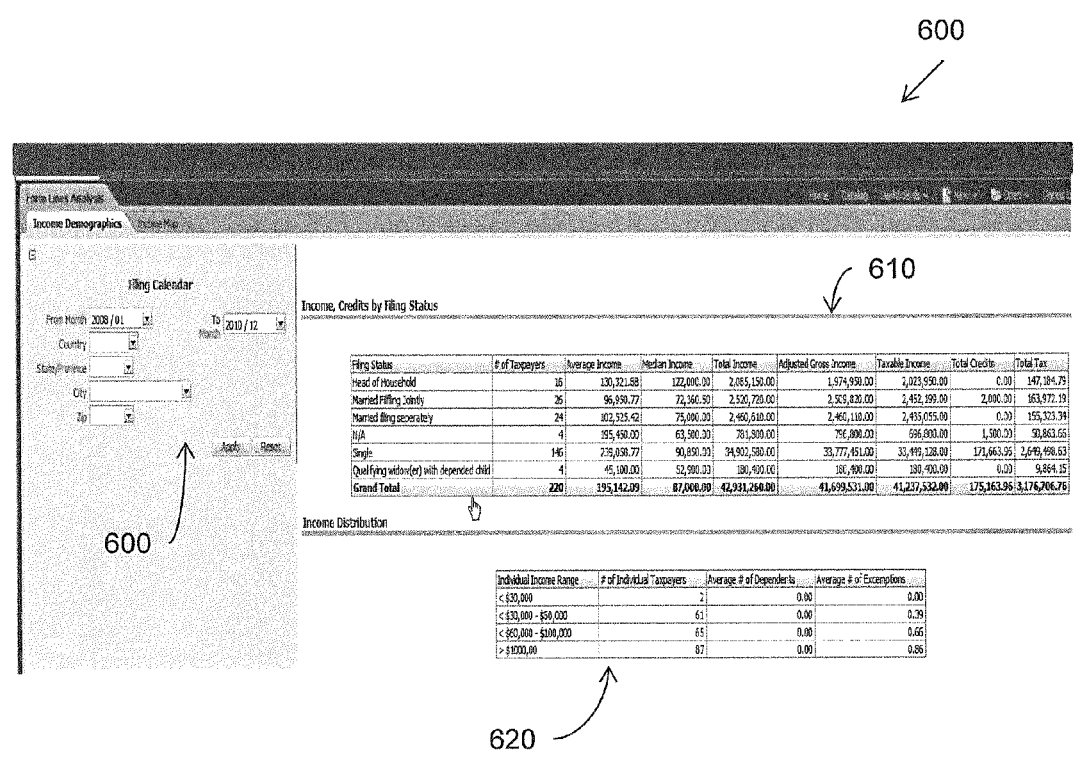

FIG. 5 illustrates an analysis screen 510 that uses pie charts to communicate various aspects of tax forms. The analysis screen includes a table of values for each pie chart. FIG. 6 illustrates an analysis screen that summarizes income demographics. An input interface 600 provides boxes into which a user can input a date range and geographic region of interest. A first table 610 breaks out income data for the different filing statuses. A second table 620 summarizes deductions and exemptions for various income brackets. This is another example of the detail provided by the tax analysis tool. In this case, the information in the tables is broken out by tax form line.

The fine level of detail is enabled by creating the tax analysis data model to support such granularity. This involves designing the star schema, data model metadata, and the ETL process to appropriately populate the data model in a manner to support fine granularity. For example, a KPI can be created from data in the Total Gross Income line in a US IRS Form 1040. To support this type of KPI, various tax form lines are modeled in the star schema such that the data in the tax form lines populate fact tables with contextual attributes (e.g., tax type, geography, filing status) populating the dimension tables. The star schema can thus be extended when lines are added or updated in tax forms. As part of the ETL process, the tax form lines are mapped to the columns in the star schema fact and dimension tables. In the data model metadata, measures are defined using the star schema.

The KPI can be created by specifying a name of the KPI (e.g., Total Gross Income). A measure in the model metadata is specified for the Total Gross Income KPI. The measure may be specified by pointing to a measure/fact column in the model metadata that provides a value for the Total Gross Income KPI. The model measure/fact column in turn points to a table/column in the star schema (e.g., the Total Gross Income column in a Form Line Fact table, or an aggregate table). Another measure in the model metadata may point to a target and threshold table column that holds target and/or threshold value for the Total Gross Income KPI. When a user looks at a KPI watchlist or scorecard, the KPI query traverses the model metadata and the star schema to produce the value for the KPI.

Figure 7:
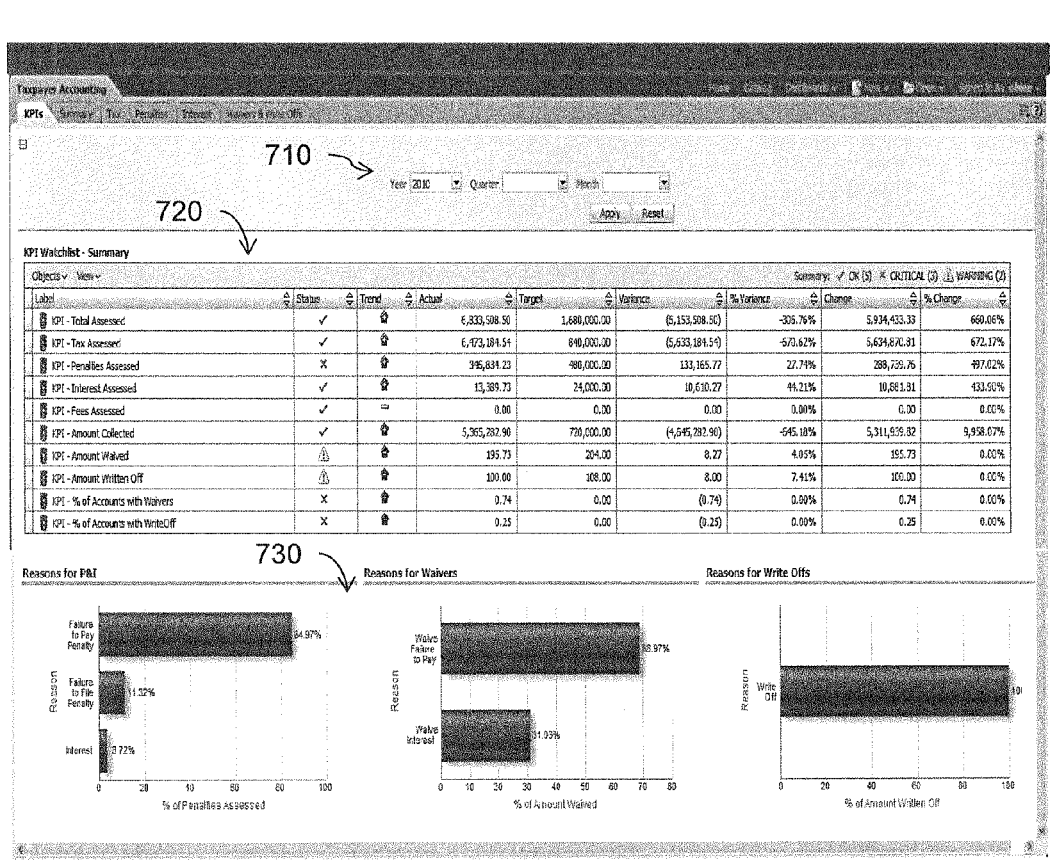
FIG. 7 illustrates one example user interface screen associated with one embodiment of a tax analysis tool.

FIG. 7 illustrates a watchlist screen for taxpayer accounting. In addition to the input interface 710 and watchlist table 720, bar charts 730 that summarize the reasons for penalty and interest, waivers, and write offs are provided.

Figure 8:
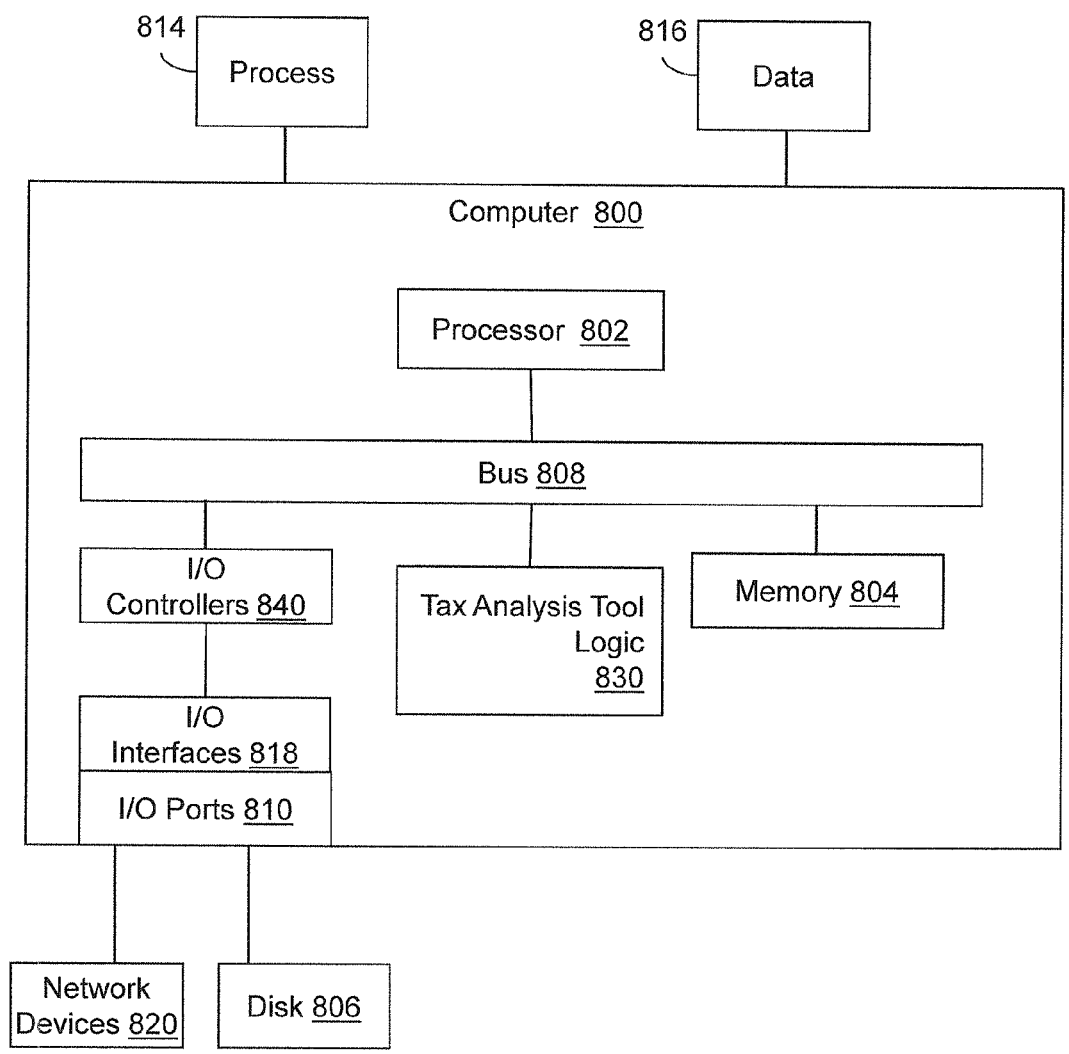
FIG. 8 illustrates an embodiment of a computing system in which example systems and methods, and equivalents, may operate.

FIG. 8 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include a tax analysis tool logic 830 configured to facilitate tax analysis. In different examples, the logic 830 may be implemented in hardware, a non-transitory computer-readable medium with stored instructions, firmware, and/or combinations thereof. While the logic 830 is illustrated as a hardware component attached to the bus 808, it is to be appreciated that in one example, the logic 830 could be implemented in the processor 802.

In one embodiment, logic 830 is a means (e.g., hardware, non-transitory computer-readable medium, firmware) for providing a tax analysis tool.

The means may be implemented, for example, as an ASIC programmed to provide a tax analysis tool. The means may also be implemented as stored computer executable instructions that are presented to computer 800 as data 816 that are temporarily stored in memory 804 and then executed by processor 802.

Generally describing an example configuration of the computer 800, the processor 802 may be a variety of various processors including dual microprocessor and other multi-processor architectures. A memory 804 may include volatile memory and/or non-volatile memory. Non-volatile memory may include, for example, ROM, PROM, and so on. Volatile memory may include, for example, RAM, SRAM, DRAM, and so on.

A disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, a memory stick, and so on. Furthermore, the disk 806 may be a CD-ROM drive, a CD-R drive, a CD-RW drive, a DVD ROM, and so on. The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., PCIE, 1394, USB, Ethernet). The bus 808 can be types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the methods described and claimed herein. In one embodiment, the method includes storing one or more KPI queries configured to be executed on tax related data stored in a tax data warehouse to return a value for a KPI; receiving a request for a KPI value; selecting a KPI query that corresponds to the requested KPI; executing the selected KPI query on the tax data warehouse; and returning results to the selected KPI query.

The method may also include retrieving a range of values associated with the selected KPI query and providing the range of values with the results to the selected KPI query. The method may also include receiving a user specified query element for the selected KPI query; executing the selected KPI query with the received query element value; and returning the KPI query result.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data on a non-transitory computer readable medium. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Query", as used herein, refers to a semantic construction that facilitates gathering and processing information. A query may be formulated in a database query language (e.g., SQL), an OQL, a natural language, and so on.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to:
   extract tax related data from a tax transaction database that stores a plurality of data records describing a plurality of tax return forms filed by a plurality of taxpayers, where each record includes values in tax return fields describing a taxpayer who filed the tax return form, further where the tax return fields include tax return lines;
   transform and store the extracted tax related data in a tax data warehouse that includes fact tables and dimension tables in at least one star schema by populating a fact table with i) values in the tax return form lines and ii) a form type identifier that identifies a type of the tax return form, where populating the fact table with values according to tax return form lines improves a granularity of analysis that can be performed using the tax data warehouse as compared to the tax transaction database;

where the tax data warehouse includes a dimension table that has i) a row for each tax form type and ii) columns storing contextual information about tax return form lines;

generate and store a plurality of key performance indicator (KPI) queries where each KPI query includes a different combination of tax metrics from the tax transaction database and one or more query elements associated with a criteria from the tax metrics;

generate a plurality of materialized views where each materialized view corresponds to one of the plurality of KPI queries and stores aggregated key performance indicator (KPI) values for the corresponding KPI query;

store the plurality of materialized views in the tax data warehouse for use in processing KPI queries;

provide and display an interface that displays one or more of the plurality of KPI queries for selection; and in response to a first KPI query being selected, cause the first KPI query to be executed on at least a first materialized view from the plurality of materialized views that corresponds to the first KPI query to return results corresponding to the first KPI query.

2. The non-transitory computer-readable medium of claim 1, further comprising instructions configured to cause the computer to:

receive a request for a KPI value;

select a KPI query that corresponds to the requested KPI;

execute the selected KPI query on the tax data warehouse; and return results to the selected KPI query.

3. The non-transitory computer-readable medium of claim 2, further comprising instructions configured to cause the computer to:

receive a user specified range of values for a selected KPI;

store the range of values in a threshold table in the tax data warehouse; and when a KPI query corresponding to the selected KPI is executed, communicate a returned valued for the selected KPI as compared to the range of values.

4. The non-transitory computer-readable medium of claim 1, further comprising instructions configured to cause the computer to:

receive a user specified query element for a KPI query;

execute the KPI query with the received query element; and return a KPI query result.

5. The non-transitory computer-readable medium of claim 1, further comprising instructions configured to cause the computer to provide one or more reports, where a report comprises a set of KPI queries that, when executed, return KPI query results according to a predetermined format.

6. A computing system, comprising:

a processor connected to at least a memory by a communication path;

an integrator logic stored on a non-transitory computer-readable medium including instructions that when executed by the processor cause the processor to:

extract tax related data from a tax transaction database that stores a plurality of data records describing a plurality of tax return forms filed by a plurality of taxpayers, where each record includes values in tax return fields describing a taxpayer who filed the tax return form, further where the tax return fields include tax return lines;

transform and store the extracted tax related data in a tax data warehouse by populating a fact table with i) values in the tax return form lines and ii) a form type identifier that identifies a type of the tax return form, where populating the fact table with values according to tax return form lines improves a granularity of analysis that can be performed using the tax data warehouse as compared to the tax transaction database;

where the tax data warehouse includes at least one dimension table configured in at least one star schema that has i) a row for each tax form type and ii) columns storing contextual information about tax return form lines;

generate and store a plurality of key performance indicator (KPI) queries where each KPI query includes a different combination of tax metrics from the tax transaction database and one or more query elements associated with a criteria from the tax metrics;

generate a plurality of materialized views where each materialized view corresponds to one of the plurality of KPI queries and stores aggregated key performance indicator (KPI) values for the corresponding KPI query; and a scorecard logic stored on a non-transitory computer-readable medium including instructions that when executed by the processor cause the processor to:

display an interface that displays one or more of the plurality of KPI queries for selection on a display screen;

in response to a user command that selects a first KPI query from the interface, execute, using the processor, the selected first KPI query on at least a first materialized view from the plurality of materialized views that corresponds to the first KPI query to return results corresponding to the first KPI query and display the results on the display screen.

7. The computing system of claim 6, where the scorecard logic comprises an interface logic configured to receive, from a user, input values for selected KPI query elements, and where the scorecard logic is configured to execute the KPI query with the input values for the selected KPI query elements on the tax related data stored in the tax data warehouse to return a value for the KPI.

8. The computing system of claim 7, where the scorecard logic is configured to store default values for the selected KPI query elements.

9. The computing system of claim 6, where the tax data warehouse comprises a threshold table configured to store a range of values for a selected KPI, where the scorecard is configured to retrieve the range of values when a KPI query corresponding to the selected KPI is executed, and to communicate a returned valued for the selected KPI as compared to the range of values.

10. The computing system of claim 6, where the scorecard logic is configured to store a report comprising a set of KPI queries and specifications describing a format in which to display results of the KPI queries, the scorecard logic further configured to execute the set of KPI queries in the report on the tax data warehouse and to provide a result of the KPI queries to the user according to the format.

11. A computer-implemented method, comprising:

extracting, by at least a processor of a computer, tax related data from a tax transaction database that stores respective records describing respective tax return forms filed by respective taxpayers, where each record includes values in tax return fields describing a taxpayer who filed the tax return form, further where the tax return fields include tax return lines;

transforming and storing, by at least the processor, the extracted tax related data in a tax data warehouse that includes fact tables and dimension tables by populating a fact table with i) values in the tax return form lines and ii) a form type identifier that identifies a type of the tax return form, where populating the fact table with values according to tax return form lines improves a granularity of analysis that can be performed using the tax data warehouse as compared to the tax transaction database;

where the tax data warehouse includes a dimension table that has i) a row for each tax form type and ii) columns storing contextual information about tax return form lines;

generating and storing, by at least the processor, a plurality of key performance indicator (KPI) queries where each KPI query includes a different combination of tax metrics from the tax transaction database and one or more query elements associated with a criteria from the tax metrics;

generating, by at least the processor, a plurality of materialized views where each materialized view corresponds to one of the plurality of KPI queries and stores aggregated key performance indicator (KPI) values for the corresponding KPI query;

storing, by at least the processor, the plurality of materialized views in the tax data warehouse;

generating and displaying, by at least the processor, an interface that displays one or more of the plurality of KPI queries for selection; and in response to a first KPI query being selected from the interface, causing the first KPI query to be executed on at least a first materialized view from the plurality of materialized views that corresponds to the first KPI query to return results corresponding to the first KPI query.

12. The computer-implemented method of claim 11, further comprising:

receiving a request for a KPI value;

selecting a KPI query that corresponds to the requested KPI;

executing the selected KPI query on the tax data warehouse; and returning results to the selected KPI query.

13. The computer-implemented method of claim 12, further comprising:

receiving a user specified range of values for a selected KPI;

storing the range of values in a threshold table in the tax data warehouse; and when a KPI query corresponding to the selected KPI is executed, communicating a returned valued for the selected KPI as compared to the range of values.

14. The computer-implemented method of claim 11, wherein the transforming further comprising:

configuring the fact tables and dimension tables in at least one star schema.

15. The computer-implemented method of claim 11, further comprising providing one or more reports, where a report comprises a set of KPI queries that, when executed, return KPI query results according to a predetermined format.

* * * * *